(12) United States Patent
Park et al.

(10) Patent No.: US 8,205,219 B2
(45) Date of Patent: Jun. 19, 2012

(54) DISK PLAYER INCLUDING A MULTIFUNCTIONAL SENSOR AND DRIVING METHOD THEREOF

(75) Inventors: Jun-tae Park, Seoul (KR); Young-yun Seol, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 12/578,778

(22) Filed: Oct. 14, 2009

(65) Prior Publication Data

US 2010/0157748 A1 Jun. 24, 2010

(30) Foreign Application Priority Data

Dec. 18, 2008 (KR) .......................... 10-2008-129657

(51) Int. Cl.
 *G11B 17/03* (2006.01)
(52) U.S. Cl. ........................ 720/606; 720/614
(58) Field of Classification Search .......... 720/601–603, 720/606, 613, 626, 645; 369/30.32, 30.8, 369/30.85–30.87, 30.93, 30.94, 30.99
 See application file for complete search history.

(56) References Cited

U.S. PATENT DOCUMENTS

| | | | | |
|---|---|---|---|---|
| 5,548,571 A | * | 8/1996 | Mistretta | 720/645 |
| 5,872,748 A | * | 2/1999 | Shindo et al. | 369/30.85 |
| 5,886,961 A | * | 3/1999 | Yamashita et al. | 369/30.3 |
| 2002/0075767 A1 | * | 6/2002 | Seo | 369/30.91 |
| 2003/0081526 A1 | * | 5/2003 | Choi et al. | 369/77.2 |
| 2005/0066341 A1 | | 3/2005 | Tokunaga | |
| 2005/0249101 A1 | * | 11/2005 | Tokunaga | 369/217 |
| 2006/0080687 A1 | * | 4/2006 | Miyashita | 720/603 |

FOREIGN PATENT DOCUMENTS

| | | |
|---|---|---|
| EP | 0724261 | 7/1996 |
| EP | 0780843 | 6/1997 |
| JP | 1097452 | 6/1989 |
| JP | 8249800 | 9/1996 |

OTHER PUBLICATIONS

European Search Report issued Mar. 18, 2010 in EP Application No. 09171339.6.

* cited by examiner

*Primary Examiner* — Nathan Danielsen
(74) *Attorney, Agent, or Firm* — Stanzione & Kim, LLP

(57) ABSTRACT

A disk player includes a body, a tray having a first seating recess and a second seating recess to load disks of a first size and a second size and slidably inserted into or ejected from a replay unit of the body, a single sensor disposed in the body to detect loading or unloading of a disk on the tray, size of the loaded disk, and insertion or ejection of the tray, and a plurality of slits penetratingly formed on the tray with different lengths to correspond to the sensor when the tray is inserted or ejected.

22 Claims, 9 Drawing Sheets

DISK PLAYER INCLUDING A MULTIFUNCTIONAL SENSOR AND DRIVING METHOD THEREOF

CROSS-REFERENCE TO RELATED APPLICATIONS

This application claims priority under 35 U.S.C. §119 (a) from Korean Patent Application No. 10-2008-0129657, filed on Dec. 18, 2008, in the Korean Intellectual Property Office, the disclosure of which is incorporated herein by reference in its entirety.

BACKGROUND

1. Field of the Invention

The present general inventive concept relates to a disk player which replays a disk storage medium such as a compact disk (CD) and a digital versatile disk (DVD), and more particularly, to a disk player with a sensor which senses presence or absence of a disk storage medium and also senses insertion or ejection of a tray.

2. Description of the Related Art

A general disk player is operated in a tray method or a slit method depending on how a disk is inserted.

In the tray method, the disk player inserts a disk into a replay unit using a tray on which the disk is seated. A seating recess on which the disk is seated is standardized, for example, to seat a disk of 80 mm in the case of a small storage medium such as a single CD and a disk of 120 mm in the case of a CD, a DVD, or a Blue-ray disk.

The disk player of the tray method is provided with a sensor to sense open and close states of the tray and another separate sensor to detect whether the disk is loaded on the tray. The sensor for sensing presence or absence of a disk uses an optical sensor, whereas the sensor for sensing open and close states of the tray uses a two-contact point switch.

The display player of the tray method described above may not smoothly sense the opening and closing operations of the disk as the two-contact point switch malfunctions if the insertion and ejection of the tray is set to be made at a high speed.

Also, even though it can be detected whether the disk is loaded on the tray, it cannot be detected whether the size of the loaded disk is 120 mm or 80 mm.

Also, since the sensor for sensing an open and closed state of the tray should be provided separate from the sensor for sensing the loading or unloading of the disk, manufacturing costs and the number of manufacturing processes increase.

SUMMARY

Example embodiments of the present general inventive concept provide a disk player which senses loading or unloading of a disk on a tray, a size of a loaded disk, and an opening or closing operation of a tray, while using a single sensor.

Additional embodiments of the present general inventive concept will be set forth in part in the description which follows and, in part, will be obvious from the description, or may be learned by practice of the general inventive concept.

Example embodiments of the present general inventive concept may be achieved by providing a disk player, including a body, a tray having a first seating recess and a second seating recess on which disks of a first size and a second size are loaded and slidably inserted into or ejected from a replay unit of the body, a single sensor disposed in the body to detect a loading or an unloading of a disk on the tray, a size of the loaded disk, and an insertion or ejection of the tray, and a plurality of slits penetratingly formed on the tray with different lengths to correspond to the sensor when the tray is inserted or ejected with respect to the disk player or other disk operating system.

The plurality of slits may include 1st and 2nd slits formed on an end part of the tray in an opening direction of the tray and disposed adjacent to each other, a 3rd slit formed on the first seating recess, a 4th slit formed on the second seating recess, and 5th and 6th slits formed on an end part of the tray in a closing direction of the tray and disposed adjacent to each other.

The 1st slit may have the same length as the 6th slit and the 2nd slit may have the same length as the 5th slit.

The 1st and the 6th slits may have the shortest length and the 3rd slit may be relatively longer. The lengths of the 1st to the 6th slits may satisfy the following inequality:

1st slit=6th slit<2nd slit=5th slit<4th slit3rd slit

Or

1st slit=6th slit<2nd slit=5th slit,

4th slit3rd slit

If the sensor senses the 2nd and the 5th slits, a controller may output a PWM control signal to reduce a moving speed of the tray.

The disk player may further include a disk storage unit on which a plurality of disks are stacked.

The disk storage unit may be disposed at a front portion or a rear portion of the replay unit.

The sensor may include a light emitter disposed at a lower portion of the tray, and a light receiver disposed at an upper portion of the tray, and the light emitter and the light receiver may be arranged so as to avoid interference with the stacked disks.

If the disk storage unit is disposed at the rear portion of the replay unit, the sensor may be disposed at a lower portion of the tray along with a light emitter and a light receiver.

The sensor may be disposed adjacent to a front surface of the disk player such that the sensor faces the 1st slit in a closed position of the tray and faces the 6th slit in an opened position of the tray.

Example embodiments of the present general inventive concept may also be achieved by providing a driving method of a disk player, the method including ejecting a tray, seating a disk on one of a first seating recess and a second seating recess of a tray that has a size corresponding to the disk, loading the tray on which the disk is seated on a replay unit, using a single sensor to sequentially detect slits of different lengths formed on the tray according to insertion or ejection of the tray to determine the presence or absence of a disk, a size of the disk, and the location of the tray, and replaying the loaded disk.

The driving method may further include, if the sensor detects the 2nd and the 5th slits, outputting a PWM control signal to reduce a moving speed of the tray.

Exemplary embodiments of the present general inventive concept may also be achieved by providing a driving unit of a disk player, including a disk tray to insert or eject a disk to or from the disk player and having a plurality of slits of different lengths, a single sensor to detect a property of at least one of the slits, and a controller to determine the presence or absence of the disk, a size of a present disk, and a insertion or an ejection of the disk based on the detected property.

The detected property can be based on a time taken to detect the property and the relative length of the slits.

The disk tray can simultaneously insert or eject multiple disks having different sizes.

The single sensor can detect the property while the disk tray is inserting or ejecting the disk.

The controller can output a pulse width modulated (PWM) signal to control a moving speed of the disk tray based on the detected property.

BRIEF DESCRIPTION OF THE DRAWINGS

These and/or other embodiments of the present general inventive concept will become apparent and more readily appreciated from the following description of the embodiments, taken in conjunction with the accompanying drawings of which.

DETAILED DESCRIPTION OF THE EMBODIMENTS

Figure 1:
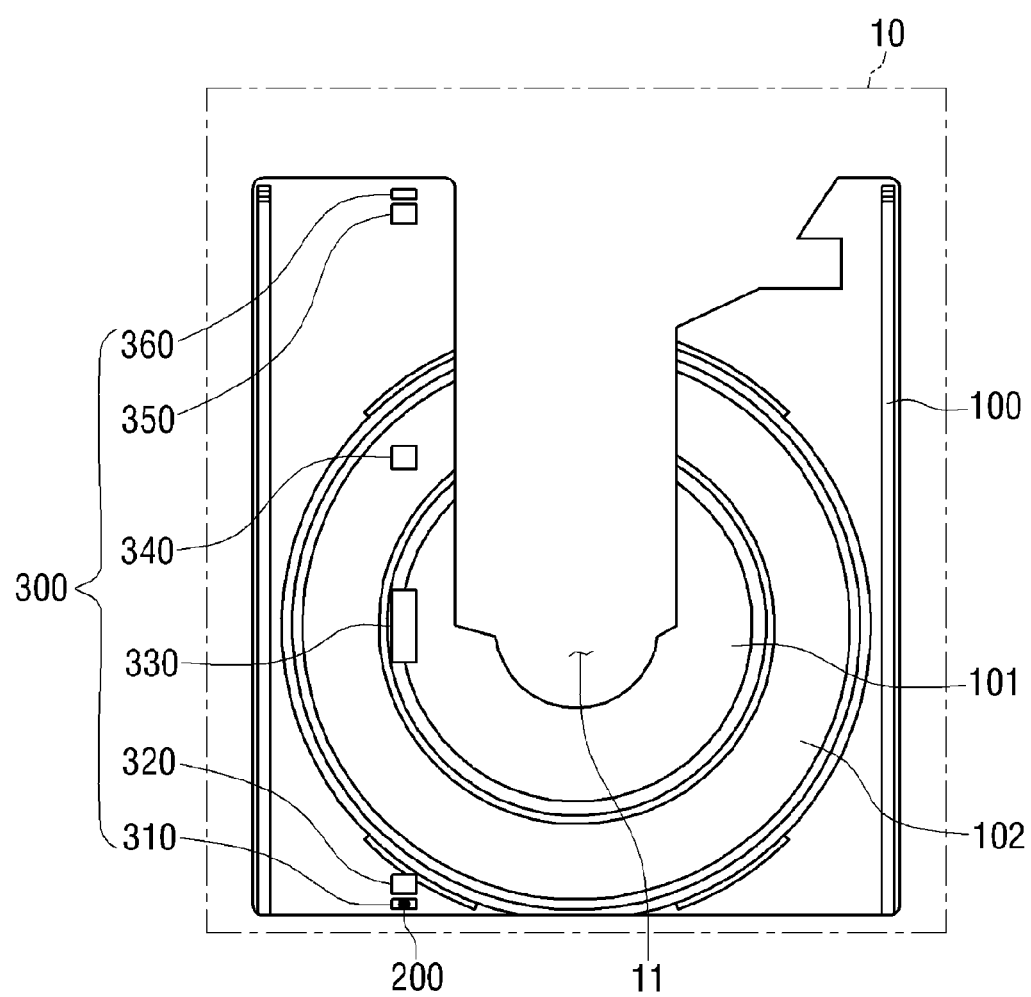
FIG. 1 is a top view illustrating a disk player according to an exemplary embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a view illustrating a disk player according to an exemplary embodiment of the present general inventive concept.

As illustrated in FIG. 1, a display player according to an exemplary embodiment of the present general inventive concept can include a body 10, a tray 100, a sensor 200, and a plurality of slits 300.

The body 10 can be provided with a replay unit 11 to replay a disk medium such as a CD and a DVD.

The tray 100 can be designed to reciprocally slide between the replay unit 11 of the body 10 and the outside of the body 10, and can include a first seating recess 101 and a second seating recess 102 on which disks of first size and second size can be loaded. The size of the disk such as a CD, a DVD, and a Blue-ray disk is standardized and the disk of the first size has a diameter of about 80 mm and the disk of the second size has a diameter of about 120 mm.

The sensor 200 can be disposed in the body 10 to sense insertion or ejection of the tray 100, loading and unloading of the disk on the first and the second seating recesses 101, 102, and the size of the loaded disk. The sensor 200 may be an optical sensor which can include a light emitter and a light receiver and the arrangement of the light emitter and the light receiver can be different depending on the type of the player. A detailed description thereof will be provided below.

The slits 300 can be penetratingly formed on the tray 100 to have different lengths and can be positioned to face the sensor 200 when the tray 100 is inserted or ejected with respect to the disk player or other disk operating system. The slits 300 can include 1st to 6th slits 310, 320, 330, 340, 350, 360 as illustrated in FIG. 1.

The 1st and the 2nd slits 310, 320 can be symmetrical to the 5th and the 6th slits 350, 360 with reference to the center of the tray 100. The 1st slit 310 can have the same length as the 6th slit 360 and the 2nd slit 320 can have the same length as the 5th slit 350.

The 1st slit 310 can sense the closed state of the tray 100 and can be positioned to face the sensor 200 when the disk loaded on the tray 100 reaches the disk replay unit 11. As illustrated in FIG. 1, the 1st slit 310 may be disposed in proximity to an end of the tray 100 in a direction in which the tray 100 outwardly protrudes.

The 2nd slit 320 can be formed adjacent to the 1st slit 310. The 2nd slit 320 can provide timing for a controller to prepare a controlling operation before the sensor 200 senses the 1st slit 310, thereby improving reliability of the insertion and ejection of the tray 100. If the sensor 200 senses the 2nd slit 320, the controller can output a PWM control signal to a driving motor to decelerate the driving motor. A detailed description thereof will be provided later.

The 3rd slit 330 can be penetratingly formed on the first seating recess 101 on which the disk of the first size (80 mm) is seated and may have a relatively longer length compared to the 1st and the 2nd slits 310, 320 and the 4th to 6th slits 340 to 360.

The 4th slit 340 can be penetratingly formed on the second seating recess 102 on which the disk of the second size (120 mm) is seated and may have a length shorter than that of the 3rd slit 330.

The 5th slit 350 can be symmetrical to the 2nd slit 320 with reference to the center of the tray 100 and can be penetratingly formed with the same length as the second slit 320.

The 6th slit 360 can be symmetrical to the 1st slit 310 with reference to the center of the tray 100 and can be penetratingly formed with the same length as the 1st slit 310.

The 5th and the 6th slits 350, 360 can be in proximity to each other like the 1st and the 2nd slits 310, 320.

According to an exemplary embodiment of the present general inventive concept, the 1st to the 6th slits 310 to 360 can be configured to satisfy the following inequality:

1st slit=6th slit<2nd slit=5th slit<4th slit3rd slit

Various combinations are possible besides the above inequality. However, the 1st slit 310 can have the same length as the 6th slit 360 and the 2nd slit 320 can have the same length as the 5th slit 350, and the 1st to the 4th slits 310 to 340 can be formed to have different lengths so that the slits can be distinguished from one another. However, it is possible that the above inequality can be satisfied by example embodiments of the present general inventive concept, considering the limited size of the tray and the installation positions of the slits. That is, the 3rd slit 330 may be longer than or equal to the 4th slit 340 in order to improve sensing performance of the 3rd slit 330, since the 3rd slit 330 can sense the presence or absence of the disk, whereas the 4th slit 340 can be a supplementary slit to recognize the disk of 120 mm.

Hereinafter, an operation of the disk player according to an exemplary embodiment of the present general inventive concept will be described with reference to FIGS. 2 to 5.

Figure 2:
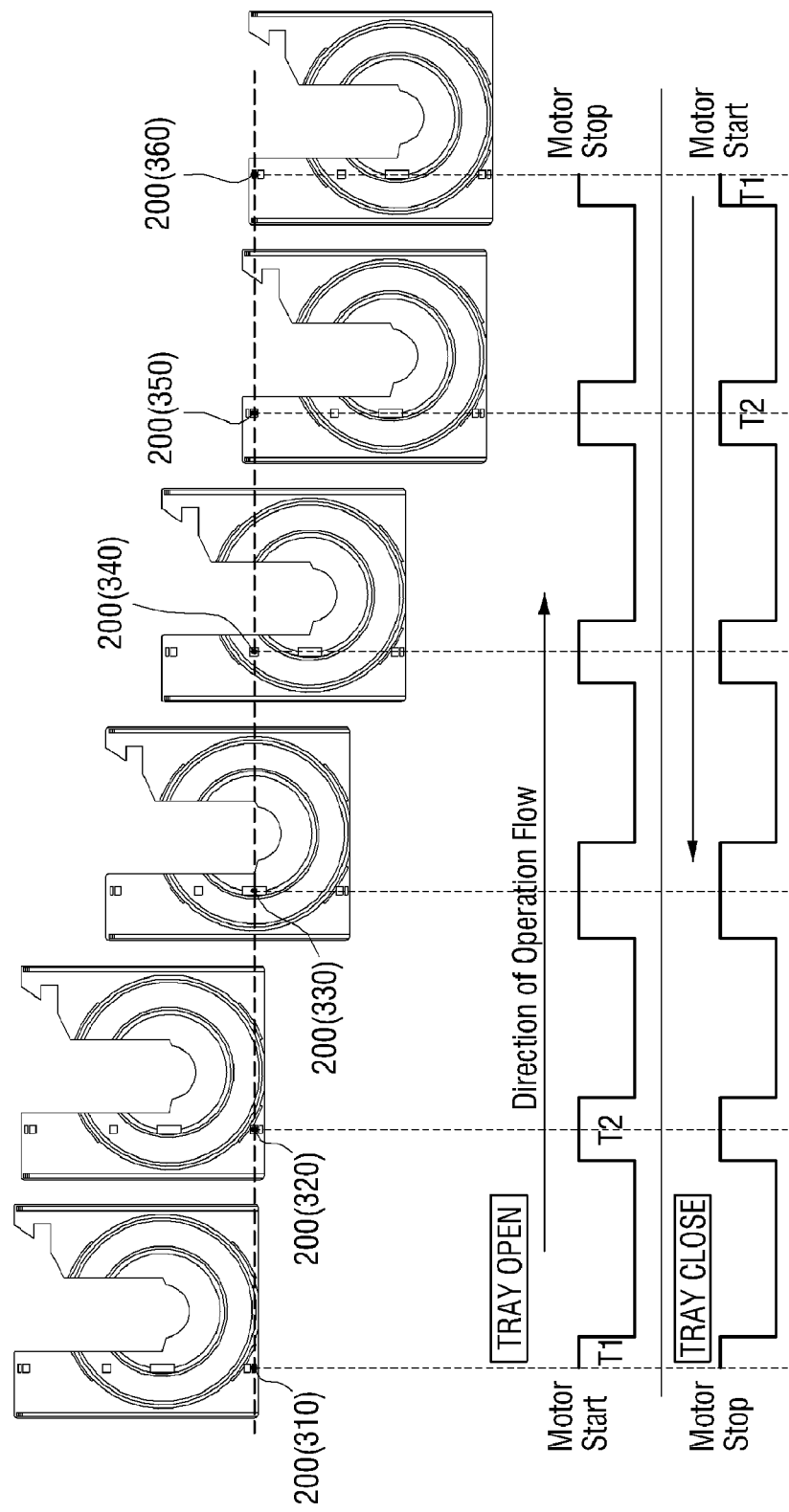
FIG. 2 is a view illustrating values output from a sensor in each phase of inserting and ejecting a tray when there is no disk.

FIG. 2 illustrates exemplary signals output from the sensor 200 when the tray is inserted and ejected with respect to the disk player with no disk thereon.

As illustrated in FIG. 2, since the 1st to 6th slits 310 to 360 can face the sensor 200 when the tray is inserted and ejected, the sensor 200 can sense the 1st to the 6th slits 310 to 360 according to the position of the tray 100 and can output the sensed values.

That is, if the tray 100 is completely closed, the sensor 200 can face the 1st slit 310 and can output a value of T1. Then, if the tray 100 moves, the sensor 200 can face the second slit 320 and can output a value of T2. After that, the sensor 200 can output different values for the 3rd to 6th slits 330 to 360 according to the movement of the tray 100. Since the 1st slit 310 can be symmetrical to the 6th slit 360 and the 2nd slit 320 can be symmetrical to the 5th slit 350, the slits symmetrical to each other can have the same value.

Since the time taken to output the sensed value can be determined depending on the length of the slit, the moving distance and position of the tray 100 can be determined based on the time taken to output the sensed value and the distance among the slits.

For example, as illustrated in FIG. 2, if the tray 100 is opened, the sensor 200 can sense the 1st to the 4th slits 310-340. Then, the controller 100 can determine that the tray 100 is being opened. In the meanwhile, if the sensor 200 senses the 5th slit 350, the driving motor (which can transmit a driving force to the tray 100) can decelerate, and if the sensor 200 senses the 6th slit 360, the driving motor can be stopped. Then, the tray 100 can stop when the tray is completely opened outside the body 10.

On the other hand, if the tray 100 is inserted, the sensor 200 can sense the slits and can output sensed values in reverse order to the above described order with respect to the opened tray. If the sensor 200 senses the 6th slits 360 to the 3rd slits 330, the controller can determine that the tray 100 is being closed. In the meanwhile, if the sensor 200 senses the 2nd slit 320, the driving motor can decelerate, and if the sensor 200 senses the 1st slit 310, the driving motor can be stopped. Then, the tray 100 can stop in the seating position in the body 10.

Since the 3rd and the 4th slits 330, 340 can be formed on the first seating recess 101 of the first size 80 mm and the second seating recess 102 of the second size 120 mm, respectively the sensor 200 can sense the size of a disk loaded on the tray 100.

Figure 3:
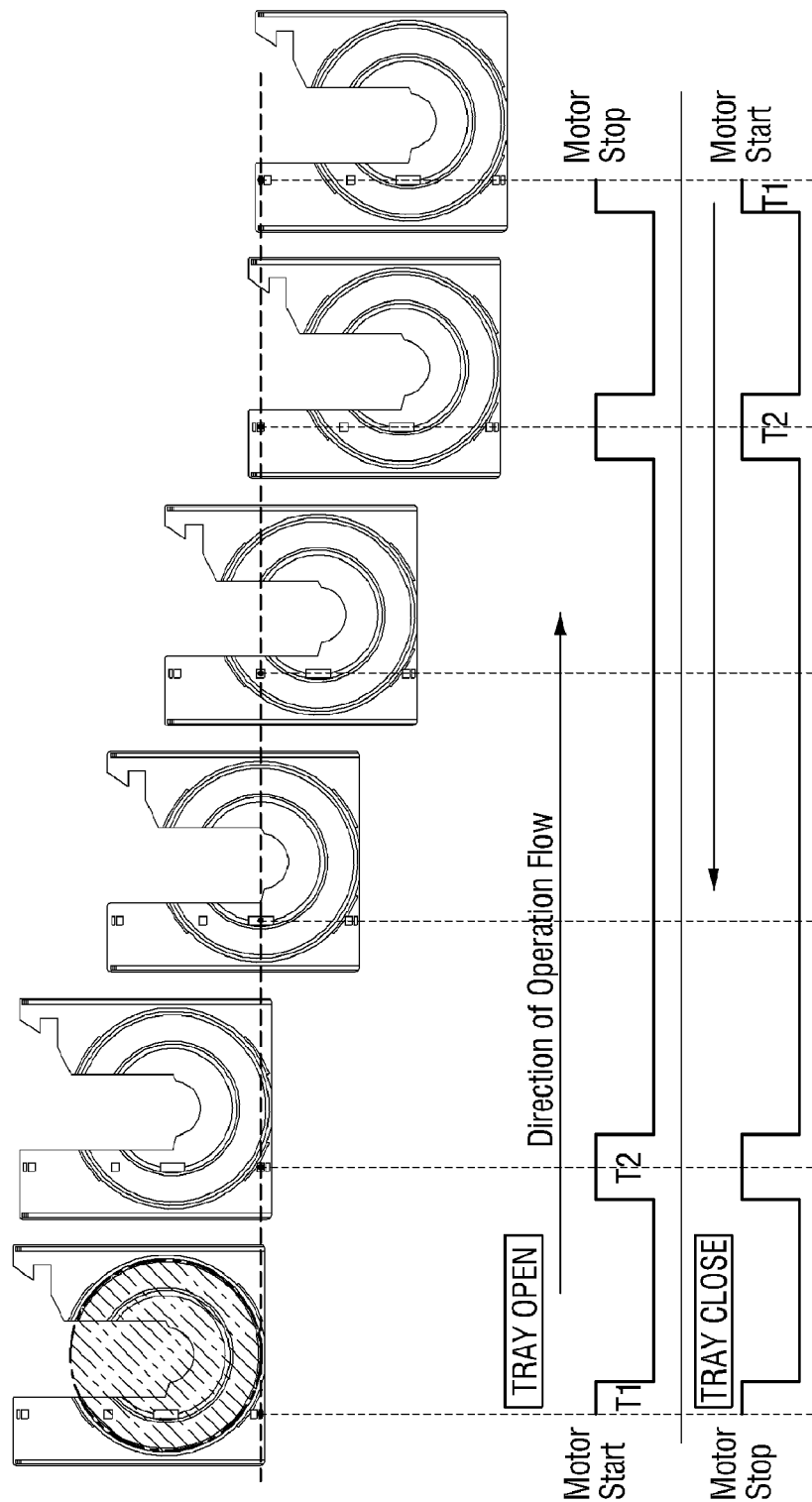
FIG. 3 is a view illustrating values output from a sensor in each phase of inserting and ejecting a tray when a disk of 120 mm is loaded.
Figure 4:
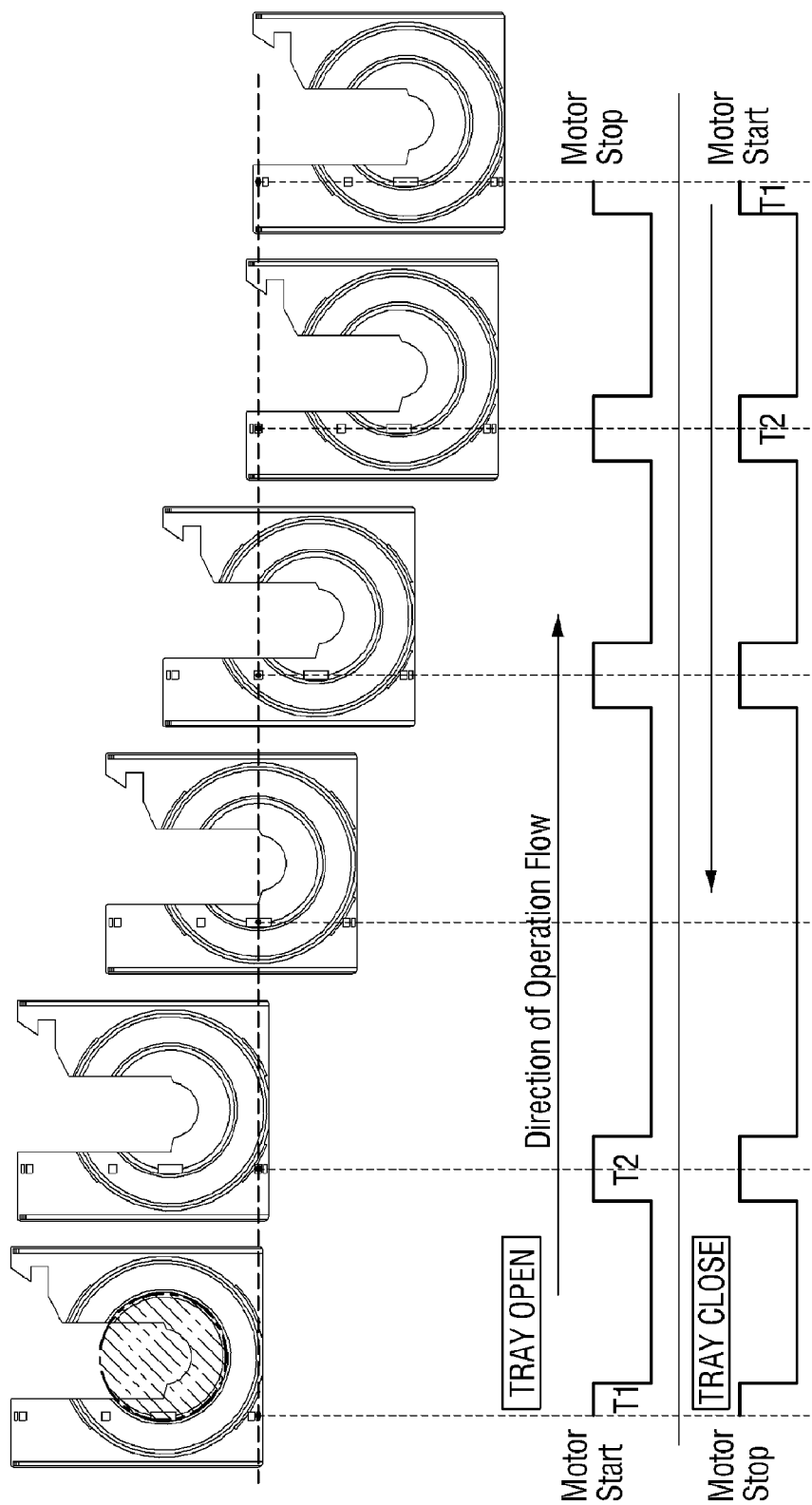
FIG. 4 is a view illustrating values output from a sensor in each phase of inserting and ejecting a tray when a disk of 80 mm is loaded.

That is, if the disk of the second size (120 mm) is loaded, the sensor 200 may not output sensed values from both the 3rd slit 330 and the 4th slit 340 as illustrated in FIG. 3. If the disk of the first size (80 mm) is loaded, only the 3rd slit 330 may be covered by the disk as illustrated in FIG. 4 such that the sensor 200 does not output a sensed value from the 3rd slit 330 and instead can output a sensed value from the 4th slit 340.

Figure 5:
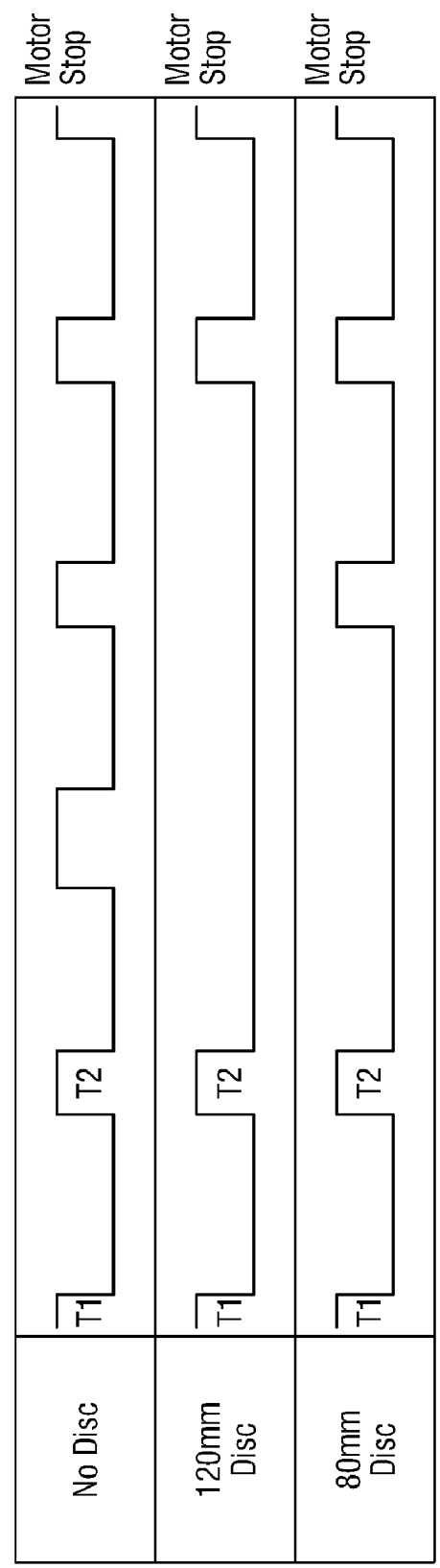
FIG. 5 is a view illustrating values output from a sensor in each phase of inserting and ejecting a tray when there is no disk, when a disk of 80 mm is loaded, and when a disk of 120 mm is loaded, for comparison.

FIG. 5 is a view illustrating values sensed by the sensor 200 to compare signals from the sensor 200 for each disk size.

As illustrated in FIG. 5, if a disk is not loaded, the sensor 200 can output sensed values from 1st to the 6th slits 310-360, and if the disk of the first size (80 mm) is loaded, the sensor 200 may not output the sensed value from the 3rd slit 330. If the disk of the second size (120 mm) is loaded, the sensor 200 may not output the sensed values from the 3rd and the 4th slits 330, 340.

Accordingly, it is possible for the controller to detect whether the disk loaded on the tray 100 is 80 mm or 120 mm based on the values output from the sensor 200 for the 3rd and the 4th slits 330, 340.

The disk player with the above-described configuration may be applied to a multi-disk player which stacks a plurality of disks thereon.

Figure 6:
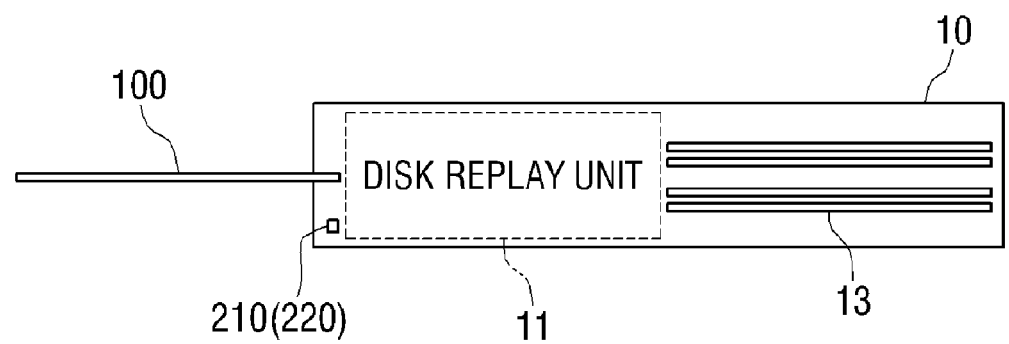
FIGS. 6 and 7 are views illustrating a disk player having a disk storage unit disposed at a rear portion of a disk replay unit according to another exemplary embodiment of the present general inventive concept.
Figure 7:
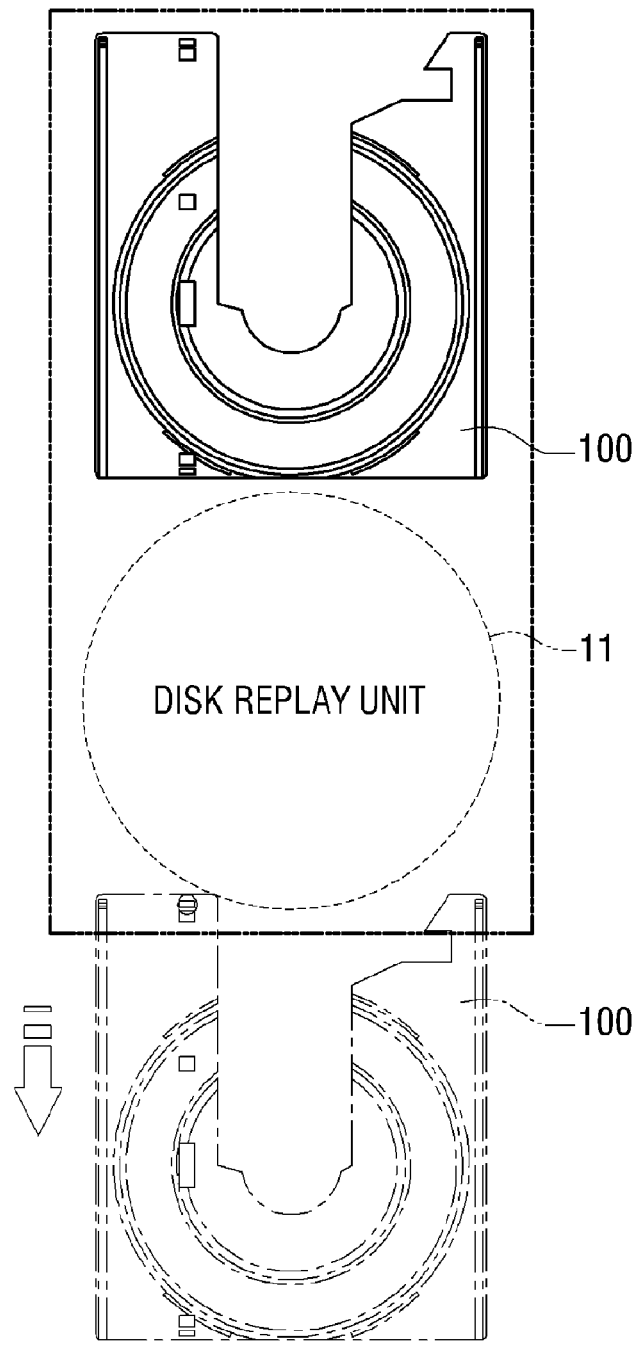

FIGS. 6 and 7 illustrate a disk player which can have a disk storage unit 13 disposed at the rear portion of a disk replay unit 11 according to another embodiment of the present general inventive concept.

This player does not substantially differ from the aforementioned player in configuration and operation. However, if a loaded disk is stacked on the disk storage unit 13 of FIGS. 6 and 7, when the sensor 200 detects the 1st slit 310 in a closing mode and determines the presence of a disk, the tray can be stopped at the replay unit such that the disk is replayed, whereas, when the sensor 200 determines the absence of a disk, a driving motor may not be stopped and may continue to be driven until the disk reaches the disk storage unit 130.

Figure 8:
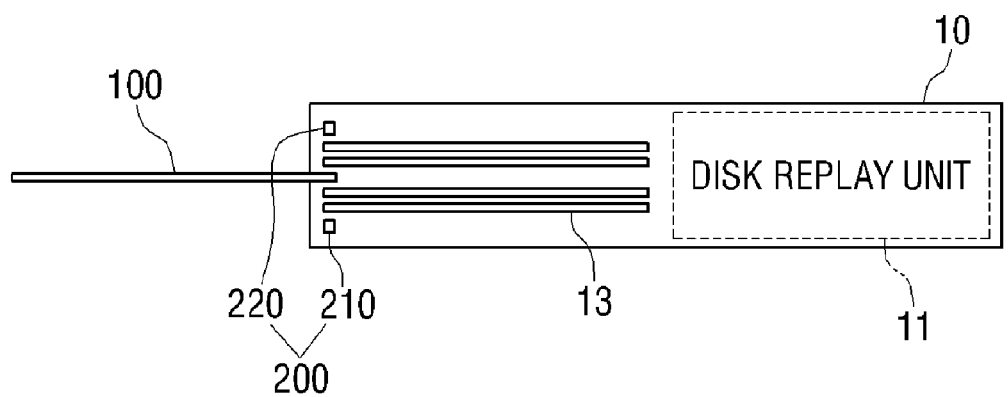
FIGS. 8 and 9 are views illustrating a disk player having a disk storage unit disposed at a front portion of a disk replay unit according to still another exemplary embodiment of the present general inventive concept.
Figure 9:
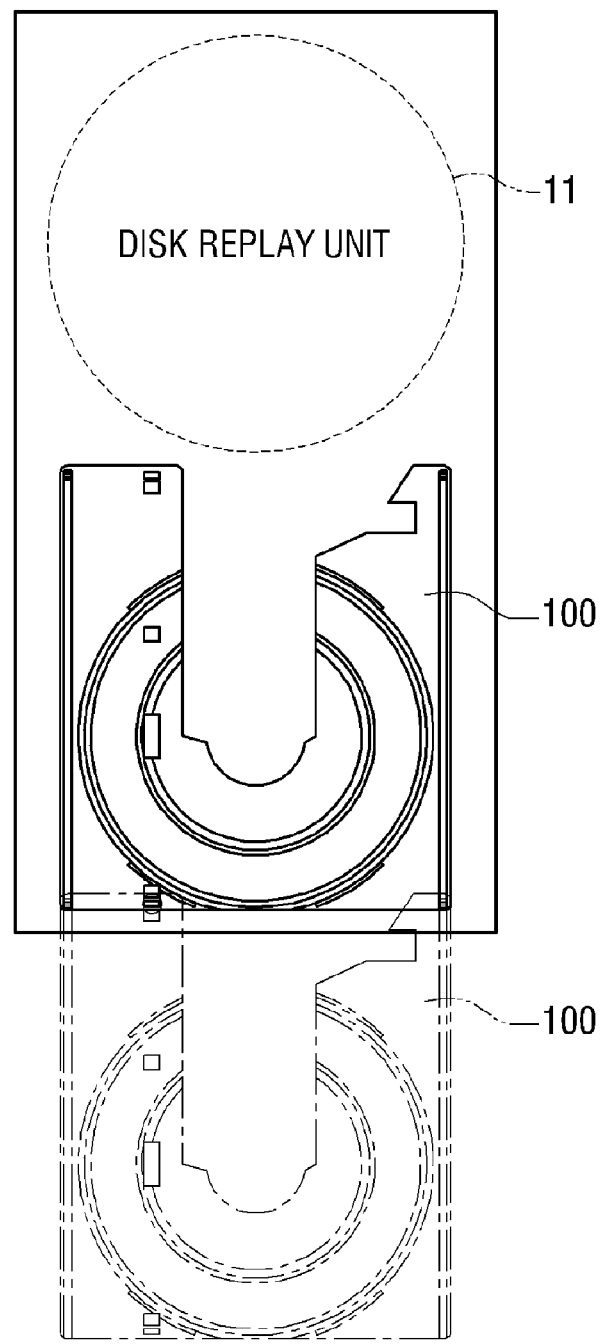

According to another exemplary embodiment of the present general inventive concept, a disk storage unit 13 may be disposed at the front portion of a disk replay unit 11 as illustrated in FIGS. 8 and 9.

In this embodiment, since a plurality of disks can be stacked on the front of a disk player, a light emitter 210 can be disposed at the lower part of the tray 100 and a light receiver 220 can be disposed at the upper part of the tray 100 so as to avoid interference with the staked disks as illustrated in FIG. 8. The positions of the light emitter 210 and the light receiver 220 may be reversed. Other operations of this embodiment are substantially the same as described above. Thus, a detailed description thereof will be omitted herein for convenience of description.

As described above, since it is possible to detect the insertion or ejection of the tray 100, the position and the size of the loaded disk using the single sensor 200, the number of components can be reduced and the tray operation can be controlled with high reliability.

In particularly, in the opening and the closing operations, since signals to decelerate the driving motor can be output when the 2nd and the 5th slits 320, 350 face the sensor 200 and a command to stop the driving motor can be performed when the 1st and the 6th slits 310, 360 face the sensor 200, the insertion and ejection of the tray 100 can be accurately controlled even if the tray is inserted or ejected at high speed.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:
1. A disk player, comprising:
a body;
a tray having a first seating recess and a second seating recess to load disks of a first size and a second size and to be slidably inserted into or ejected from a replay unit of the body;
a single sensor disposed in the body to detect a loading or unloading of a disk on the tray, and insertion or ejection of the tray; and
a plurality of slits which is penetratingly formed on the tray in line in an opening direction of the tray and comprises at least one slit for detecting the loading or unloading of the disk and at least one slit for detecting the insertion or ejection of the tray.

2. The disk player of claim 1, further comprising a disk storage unit on which a plurality of disks are stacked.

3. The disk player of claim 2, wherein the disk storage unit is disposed at a front portion of the replay unit.

4. The disk player of claim 3, wherein the sensor comprises a light emitter disposed at a lower portion of the tray, and a light receiver disposed at an upper portion of the tray, and the light emitter and the light receiver are arranged to avoid interference with the plurality of stacked disks.

5. The disk player of claim 3, wherein the sensor comprises a light emitter disposed at an upper portion the tray, and a light receiver disposed at a lower portion the tray, and the light emitter and the light receiver are arranged to avoid interference with the plurality of stacked disks.

6. The disk player of claim 2, wherein the disk storage unit is disposed at a rear portion of the replay unit.

7. The disk player of claim 6, wherein the sensor is disposed at a lower portion of the tray along with a light emitter and a light receiver.

8. The disk player of claim 6, wherein the sensor comprises:
a light emitter disposed at an upper portion of the tray; and
a light receiver disposed at a lower portion of the tray such that the light emitter and the light receiver are arranged to avoid interference with the plurality of stacked disks.

9. The disk player of claim 6, wherein the sensor comprises:
a light emitter disposed at a lower portion of the tray; and
a light received disposed at an upper portion of the tray such that the light emitter and the light receiver are arranged to avoid interference with the plurality of stacked disks.

10. The disk player of claim 1, wherein the plurality of slits comprises at least one slit for detecting a size of the loaded disk, the single sensor detects a size of the loaded disk using the at least one slit.

11. The disk player of claim 10, wherein the plurality of slits has different lengths to correspond to the sensor when the tray is inserted or ejected.

12. The disk player of claim 11, wherein the plurality of slits comprise $1^{st}$ and $2^{nd}$ slits formed on an end part of the tray in an opening direction of the tray and disposed adjacent to each other, a $3^{rd}$ slit formed on the first seating recess, a $4^{th}$ slit formed on the second seating recess, and $5^{th}$ and $6^{th}$ slits formed on an end part of the tray in a closing direction of the tray and disposed adjacent to each other.

13. The disk player of claim 12, wherein the $1^{st}$ slit has the same length as the $6^{th}$ slit and the $2^{nd}$ slit has the same length as the $5^{th}$ slit.

14. The disk player of claim 13, wherein the $1^{st}$ and the $6^{th}$ slits have the shortest length and the $3^{rd}$ slit is relatively longer than the other slits.

15. The disk player of claim 14, wherein the lengths of the $1^{st}$ to the $6^{th}$ slits satisfy the following inequality:

$1^{st}$ slit=$6^{th}$ slit<$2^{nd}$ slit=$5^{th}$ slit<$4^{th}$ slit≦$3^{rd}$ slit.

16. The disk player of claim 15, wherein, if the sensor senses the $2^{nd}$ and the $5^{th}$ slits, a controller outputs a PWM control signal to reduce a moving speed of the tray.

17. The disk player of claim 15, wherein the sensor is disposed adjacent to a front surface of the disk player such that the sensor faces the $1^{st}$ slit in a closed position of the tray and faces the $6^{th}$ slit in an opened position of the tray.

18. The disk player of claim 14, wherein the lengths of the $1^{st}$ to the $6^{th}$ slit satisfy the following inequality;

$1^{st}$ slit=$6^{th}$ slit<$2^{nd}$ slit=$5^{th}$ slit, $4^{th}$ slit≦$3^{rd}$ slit.

19. The disk player of claim 18, wherein, if the sensor senses the $2^{nd}$ and the $5^{th}$ slits, a controller outputs a PWM control signal to reduce a moving speed of the tray.

20. The disk player of claim 18, wherein the sensor is disposed adjacent to a front surface of the disk player such that the sensor faces the $1^{st}$ slit in a closed position of the tray and faces the $6^{th}$ slit in an opened position of the tray.

21. A driving method of a disk player, comprising:
ejecting a tray;
seating a disk on one of a first seating recess and a second seating recess of the tray having a size corresponding to the disk;
loading the tray on which the disk is seated on a replay unit;
using a single sensor to sequentially detect a plurality of slits of different lengths formed on the tray according to insertion or ejection of the tray to determine presence or absence of a disk, size of the disk, and location of the tray; and
replaying the loaded disk.

22. The driving method of claim 21, further comprising, if the sensor detects a $2^{nd}$ slit and a $5^{th}$ slit from the plurality of slits, outputting a PWM control signal to reduce a moving speed of the tray.

* * * * *